May 16, 1961 J. T. CABBAGE 2,984,693
DEFLUORINATION OF REACTION PRODUCTS
Filed Aug. 28, 1959
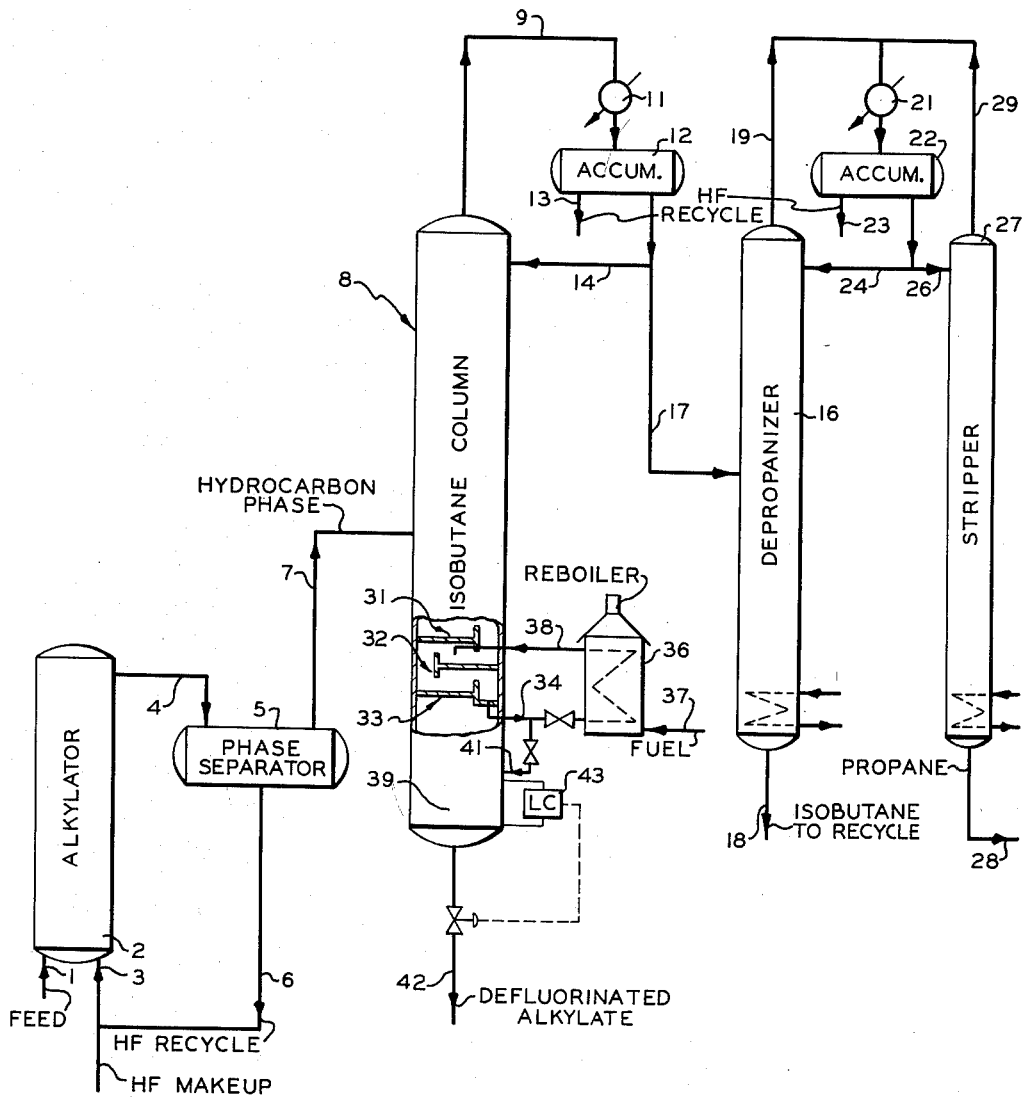
INVENTOR.
J.T. CABBAGE
BY Hudson & Young
ATTORNEYS

United States Patent Office 2,984,693
Patented May 16, 1961

2,984,693

DEFLUORINATION OF REACTION PRODUCTS

John T. Cabbage, Bartlesville, Okla., assignor to Phillips Petroleum Company, a corporation of Delaware Filed Aug. 28, 1959, Ser. No. 836,720

8 Claims. (Cl. 260—683.42)

This invention relates to the defluorination of the reaction products of conversion processes utilizing hydrofluoric acid as a catalyst. In another aspect, it relates to the removal of hydrogen fluoride from the hydrocarbon phase of an alkylation process using hydrofluoric acid as a catalyst. In another aspect it relates to the thermal decomposition of the organic fluoride compounds contained in a hydrocarbon fraction such as the alkylate fraction obtained by the hydrofluoric acid-catalyzed isobutane-olefin alkylation process.

Concentrated or substantially anhydrous hydrofluoric acid is used as a catalyst in numerous organic reactions. For example, it is employed as a catalyst, alone or in admixture with minor amounts of a boron halide such as boron fluoride, in the conversion of hydrocarbons by alkylation, isomerization, disproportionation, and the like. It is also used as a refining agent and/or a selective solvent to remove materials such as organic fluoride compounds, sulphur compounds, and other non-hydrocarbon organic impurities from liquid hydrocarbon materials.

In the alkylation of low-boiling paraffinic hydrocarbons with alkylating reactants to form normally liquid paraffins having high octane numbers, hydrofluoric acid finds perhaps its most important use as a catalyst. It is in such alkylation processes that the subject invention finds particular utility; however it should be understood that it is not limited thereto but can be employed in any other hydrocarbon conversion process where it is desired to thermally decompose organic fluoride compounds contained in reaction products.

In such alkylation processes, low-boiling paraffinic hydrocarbons, particularly isobutane and/or isopentane, and alkylating agents, particularly low-boiling olefins such as propylene, various butylenes, and/or various amylenes or the corresponding alkyl fluorides are intimately contacted in liquid phase at temperatures between about 50 and about 150° F. with liquid, concentrated hydrofluoric acid. The reaction periods range from about 0.2 to about 30 minutes, and thereafter the reaction effluents are passed to a settling zone for separation into a liquid hydrocarbon phase as a liquid acid phase. A large proportion of the liquid hydrofluoric acid phase from this settling zone is generally recycled to the reaction zone while some is withdrawn and subjected to purification for the removal of water and acid-soluble organic impurities. The hydrocarbon phase from the settling zone is generally subjected to fractional distillation to remove hydrogen fluoride dissolved therein, which is generally present to the extent of about 0.5 to about 3 percent by volume, and to separate various hydrocarbon fractions which may comprise unreacted isobutane, unreacted normal butane and one or more alkylate fractions. This invention is primarily concerned with the removal of the hydrogen fluoride from the hydrocarbon phase and the defluorination of the alkylate fractions from the primary fractionator.

While hydrogen fluoride can be readily separated from the alkylate by the above-mentioned processes of phase separation and fractionation, the organic fluorides which form during the reaction pose a more difficult separation problem.

In one conventional alkylation process, the alkylate fraction recovered by the fractional distillation of the hydrocarbon phase is passed to a chemical defluorination means for the removal of any organic fluoride compounds. This removal is generally effected by contact with a contact mass such as bauxite, alumina, alumina chromium oxide, or similar material. This method of removing organic fluoride compounds is often inefficient and uneconomical because the contact material is short-lived and the spent contact material must be regenerated periodically; then, too, it is not possible to recover the hydrogen fluoride for reuse.

In a more recent conventional alkylation process, the organic fluoride compounds contained in the alkylate fraction are decomposed by thermal means, such as by an external reboiler, hydrogen fluoride vapor being recoverable and reboiler heat being used to supply heat to the primary fractionator. Although this type of thermal defluorination is generally satisfactory, the conditions are such that a small but significant amount of organic fluorides are still not decomposed and are carried along with the alkylate fraction.

Accordingly, the object of this invention is to defluorinate reaction products. Another object is to provide a method and apparatus for more complete removal of hydrogen fluoride from the hydrocarbon phase of an alkylation process using hydrofluoric acid as a catalyst. Another object is to provide an improved method and apparatus for the recovery of hydrogen fluoride from an alkylate fraction comprising hydrocarbons and organic fluoride compounds, such as the alkylate fraction obtained by the hydrofluoric acid-catalyzed isobutane-olefin alkylation processes. A further object of this invention is to provide an improved method and apparatus for defluorinating the reaction products in an alkylation process by an improved thermal decomposition of the organic fluoride compounds present in the alkylate fraction. A still further object of this invention is to provide a method of defluorination in an alkylation process which will result in a material savings in the maintenance cost of the equipment for purifying the alkylate fraction. Other objects and advantages of this invention will become apparent to those skilled in the art from the following description and the accompanying drawing wherein the single figure diagrammatically illustrates by means of a flow diagram one arrangement of apparatus suitable for practicing my invention.

Referring now to the drawing, an alkylation process is illustrated which utilizes the present invention. Low-boiling paraffinic hydrocarbons such as isobutane and propane and alkylating reactants such as butylene and propylene are introduced via line 1 into an alkylator 2. Hydrofluoric acid catalyst is introduced into alkylator 2 through line 3 where it is intimately mixed with the hydrocarbon feed. The conditions of temperature, pressure and reaction time as well as the ratios of paraffinic hydrocarbon to olefin and a hydrocarbon to acid are well known in the art. For example, the mol ratio of isobutane to olefin in the total feed can be between about 1.5:1 and 12:1, usually about 5:1. The ratio of hydrocarbon to acid catalyst will be generally about 0.5:1 and 10:1 on a liquid volume basis. The reactants are intimately contacted with the acid catalyst in the alkylator 2 at temperatures between about 50 and about 150° F, and at a pressure sufficient to maintain the reactants in a liquid phase for a residence time of about 0.2 to about 30 minutes.

After a suitable contact period, the reaction mixture is passed from alkylator 2 through line 4 to a phase separator or acid settler 5 wherein a phase separation between the liquid hydrocarbon phase and the liquid hydrofluoric acid phase is readily carried out by settling. The acid phase is recycled via line 6 to the alkylator 2. While the flow diagram shows a direct course for this recycle acid, it is understood that intermediate purification steps can be employed if desired.

The lighter or hydrocarbon phase from the phase separator 5 is passed through line 7 to primary fractionator 8, such as an isobutane column. A low-boiling mixture of hydrofluoric acid and low-boiling paraffins, such as propane and isobutane, is passed overhead through line 9 and after being cooled in cooler 11 enters accumulator 12 as a liquid. In accumulator 12, the mixture separates into an acid phase and a hydrocarbon phase, and the acid phase is returned to the system via line 13. The hydrocarbon phase is withdrawn from accumulator 12 through line 14 and a portion thereof is recycled to primary fractionator 8 while the remainder is charged to a depropanizer 16 through line 17. From the bottom of depropanizer 16, a stream, comprising mainly isobutane, is taken off through line 18 and recycled to the alkylator 2. A mixture comprising hydrogen fluoride and propane is passed overhead from depropanizer 16 through line 19, and thereafter is passed through cooler 21 into accumulator 22. In accumulator 22, the mixture separates into an acid phase and a hydrocarbon phase, the acid phase being returned to the system through line 23. The hydrocarbon phase is withdrawn from accumulator 22 through line 24, and a portion thereof is recycled to depropanizer 16 while the remainder is introduced via line 26 into stripper 27. From the bottom of stripper 27, a stream of propane is taken off through line 28 while the overhead, comprising a mixture of hydrogen fluoride and propane, is passed by means of line 29 through cooler 21 into accumulator 22.

Referring again to primary fractionator 8, this fractionator can contain the usual vapor-liquid contacting trays, such as bubble-cap trays, sieve trays, plate trays, etc., two of which trays 31, 32 are shown in the bottom section of the fractionator. The lower-most tray 33, according to this invention, is a trap-out tray, or the like, and from this bottom trap-out tray a fraction, comprising heavy and light alkylates, unreacted isobutane, normal butane, and undesirable hydrocarbon-soluble organic fluoride compounds, is withdrawn via line 34. The major proportion of the fraction withdrawn from the trap-out tray 33 is sent to suitable indirect heat exchange means 36, such as a direct fired reboiler, which functions as a defluorination zone. Reboiler 36 can be fired by fuel fed through line 37, the products of combustion being removed via a stack at the top of the reboiler. Alternatively, instead of a direct fired reboiler, any simple heat exchanger can be employed using steam, Dowtherm, or other heat transfer material. In the reboiler, operated at about 350 to 500° F., preferably 400 to 450° F., products of organically combined fluorine predominately in the $C_3$—$C_4$ range, such as isopropyl fluoride and butyl fluoride, are thermally decomposed to release hydrogen fluoride and vaporized light hydrocarbons. The defluorinated reboiler vapor effluent is passed via line 38 into the lower section of the primary fractionator 8 at a point above the trap-out tray 33, such as at a point directly above the lower-most conventional tray 32. The reboiler effluent flow is controlled so as to provide the required amount of reboiling heat to the fractionator.

The minor proportion of the fraction withdrawn from the trap-out tray 33 is charged to the kettle 39, for example by means of line 41. Alternatively, this minor proportion of the fraction on tray 33 can be introduced into the kettle 39 by means of suitable holes of predetermined diameter in this trap-out tray. In the kettle 39, the temperature (e.g. 280–325° F.) and residence (e.g. 500–3500, preferably 1000–3000 sec.) are such as to provide further defluorination, the residence time in this kettle being greater than that in conventional processes, whereby a greater defluorination is effected at the conditions of temperature. The defluorinated fraction, containing substantially no organic fluoride compounds, leaves the kettle 39 through line 42. A suitable liquid level controller 43 can be provided to actuate a valve in line 42 to control the amount of liquid leaving the kettle.

The kettle product in line 42 can be further fractionated to remove isobutane and the like and can, if desired, be passed through suitable contact material, such as bauxite, for the removal of any traces of organic fluoride compounds which may have not been removed as a result of the thermal decomposition previously discussed. However, where such bauxite treating is used, the life of the contact material will be substantially greater than that heretofore possible in other thermal defluorination processes because the amount of organic fluoride compounds remaining in the defluorinated kettle product is substantially lower.

To further illustrate the objects and advantages of this invention the following comparative example is set forth.

*Example*

In this example, the thermal defluorination operation of the subject invention is compared with the thermal defluorination operations of two prior art or conventional systems. In this comparative example, the deisobutanized alkylate from a hydrofluoric acid-catalyzed isobutane-olefin alkylation process is defluorinated in each case under the same conditions of operation. Under conditions A, the reboiler destruction rate is low, i.e., 11.4% of fluorides charged to the reboiler, and under conditions B the reboiler destruction rate is high, i.e, 75% of fluorides charged to the reboiler. The three compared thermal defluorination operations are described as follows:

*Case I.*—From the bottom conventional bubble-cap tray of a deisobutanizer fractionating column, internal reflux flows into the kettle of the fractionator, from which a stream is withdrawn, a minor portion of this withdrawn stream yielded as net defluorinated alkylate and a major portion of the withdrawn stream being charged to a reboiler defluorination zone and the reboiler effluent returned directly to the kettle of the fractionator.

*Case II.*—From the bottom conventional bubble-cap tray of a deisobutanizer fractionating column, the internal reflux flows into a first section of a fractionator kettle divided by a vertical dam or baffle, the liquid from this first kettle section being charged to a reboiler defluorination zone, the effluent therefrom returned directly to the second section of the fractionator kettle from which defluorinated alkylate is withdrawn, a portion of the latter being combined with liquid withdrawn from said first kettle section and sent to the reboiler, and the remaining portion of the defluorinated alkylate from the second section being removed from the kettle as net product.

*Case III.*—According to the instant invention, deisobutanized internal reflux is withdrawn from a trap-out tray just above the kettle section of a deisobutanizer fractionator column, the withdrawn liquid being divided into two portions, the major portion being charged to the reboiler defluorination zone and the effluent therefrom being returned to the fractionator at a point above the trap-out tray, and the minor portion of said withdrawn liquid being charged directly to the kettle and ultimately yielded therefrom as net defluorinated alkylate product.

In each of the operations, the fraction ($x$) of the organic fluorides destroyed in the kettle section of the fractionators and in the reboiler were both determined according to the equation:

$$x = 1 - \frac{1}{e^{kt}}$$

wherein $e$ is the natural logarithm base (2.718), $k$ is the specific reaction rate at the temperature of the system (varying from about 0.00049 at 290° F. in the kettle to about 0.0007 at 400° F. in the reboiler effluent line) and $t$ is the residence time of fluorides in the kettle or in the reboiler under reaction conditions. These fractions were recorded as destruction rate percentages. The conditions of operations and results obtained are set forth in Table I.

TABLE I

| Operating Conditions and stream compositions | Thermal Defluorination Operation | | | | | |
|---|---|---|---|---|---|---|
| | Case I | | Case II | | Case III | |
| | Conditions A | Conditions B | Conditions A | Conditions B | Conditions A | Conditions B |
| Kettle charge: | | | | | | |
| Hydrocarbon, bbl./hr. | 967 | 967 | 967 | 967 | 967 | 967 |
| Fluorides,[1] lb./hr. | 9.6 | 9.6 | 9.6 | 9.6 | 9.6 | 9.6 |
| Kettle temperature, °F. | 290 | 290 | 290 | 290 | 290 | 290 |
| Charge to reboiler: | | | | | | |
| Hydrocarbon, bbl./hr. | 1,250 | 1,250 | 1,250 | 1,250 | 1,250 | 1,250 |
| Fluorides,[1] lb./hr. | 27.92 | 9.78 | 18.39 | 10.29 | 40.30 | 10.80 |
| Reboiler destruction rate, percent | 11.4 | 75 | 11.4 | 75 | 11.4 | 75 |
| Reboiler effluent temp. °F. | 400 | 400 | 400 | 400 | 400 | 400 |
| Yield from reboiler: | | | | | | |
| Hydrocarbon bbl./hr. | 1,250 | 1,250 | 1,250 | 1,250 | 1,250 | 1,250 |
| Fluorides,[1] lb./hr. | 24.73 | 2.45 | 16.29 | 2.57 | 35.70 | 2.70 |
| Hydrofluoric acid,[1] lb./hr. | 3.19 | 7.33 | 2.10 | 7.72 | 4.60 | 8.10 |
| Reboiler to yield ratio | 8:1 | 8:1 | 8:1 | 8:1 | 8:1 | 8:1 |
| Kettle vapor yield: | | | | | | |
| Hydrocarbon, bbl./hr. | 812 | 812 | 812 | 812 | 812 | 812 |
| Hydrofluoric acid,[1] lb./hr. | 6.14 | 8.39 | 4.34 | 8.77 | 7.37 | 9.00 |
| Kettle residence time, sec. | 183 | 183 | 183 | 183 | 1,660 | 1,660 |
| Kettle destruction rate, percent | 8.6 | 8.6 | 8.6 | 8.6 | 55.4 | 55.4 |
| Bottoms yield from kettle: | | | | | | |
| Hydrocarbon, bbl./hr. (gross) | 1,405 | 1,405 | 1,405 | 1,405 | 155 | 155 |
| Hydrocarbon, bbl./hr. (net) | 155 | 155 | 155 | 155 | 155 | 155 |
| Fluorides,[1] lb./hr. (net) | 3.46 | 1.31 | 5.26 | 0.83 | 2.23 | 0.60 |

[1] Measured as fluorine.

The data in Table I show that the net bottoms yield from the fractionator operating according to the subject invention contains substantially less organic fluorides that that obtained from the fractionators operated in accordance with the prior art, due to increased residence time at defluorinating conditions of this net material in the kettle.

Various modifications and alterations of this invention will become apparent to those skilled in the art without departing from the scope and spirit of this invention, and it should be understood that the foregoing discussion and examples are merely set forth for illustrative purposes and should not unduly limit this invention.

I claim:

1. In a process for the conversion of hydrocarbons in the presence of a hydrofluoric acid catalyst, wherein liquid hydrocarbons from such a conversion are passed to a fractional distillation zone to separate a vaporous fraction comprising hydrogen fluoride and low-boiling hydrocarbons from a liquid hydrocarbon fraction containing dissolved organic fluoride compounds, the steps of withdrawing a major portion of said liquid hydrocarbon fraction from the lower section of said distillation zone and passing it to a first defluorination zone, passing vaporous effluent from the latter directly back to said lower section of said distillation zone, passing a minor portion of said liquid hydrocarbon fraction to a second defluorination zone disposed in said distillation zone below said lower section, said minor portion being the sole stream charged to said second defluorination zone, and withdrawing the resulting defluorinated hydrocarbon fraction from said second defluorination zone as net defluorinated product.

2. In a process for the conversion of hydrocarbons in the presence of a hydrofluoric acid catalyst, wherein the effluent from such a conversion is introduced into a separating zone wherein liquid hydrofluoric acid is separated from liquid hydrocarbons, said liquid hydrocarbons passed to a fractional distillation zone wherein a vaporous fraction comprising hydrogen fluoride and low-boiling paraffinic hydrocarbons is separated from a liquid hydrocarbon fraction containing dissolved organic fluoride compounds, the improvement comprising withdrawing a major portion of said liquid hydrocarbon fraction from the lower section of said distillation zone and passing it to a first defluorination zone wherein organic fluorine compounds are thermally decomposed and vapors containing hydrogen fluoride are formed, passing vaporous effluent from said first defluorination zone directly to said lower section of said distillation zone, passing a minor portion of said liquid hydrocarbon from said lower section of said distillation zone to the kettle of the latter which serves as a second defluorination zone, said minor portion being the sole stream charged to said kettle, and withdrawing the resulting defluorination hydrocarbon fraction from said second defluorination zone as net defluorinated product.

3. The process according to claim 2, wherein said first defluorination zone is an external reboiling zone.

4. In a process for the alkylation of a low-boiling isoparaffin with low-boiling olefin in the presence of a hydrofluoric acid catalyst, wherein the effluent of such an alkylation is separated into a hydrofluoric acid phase and a hydrocarbon phase, and said hydrocarbon phase is introduced into a fractional distillation zone for separation into a vaporous hydrofluoric acid fraction and a liquid hydrocarbon fraction containing dissolved organic fluorides, the improvement comprising the steps of withdrawing a major portion of said liquid hydrocarbon fraction from the lower section of said distillation zone and passing it to a first defluorination zone, passing vaporous effluent from the latter directly back to said lower section of said distillation zone, passing a minor portion of said liquid hydrocarbon fraction to a second defluorination zone disposed in said distillation zone below said lower section, said minor portion being the sole stream charged to said second defluorination zone, and withdrawing the resulting defluorinated hydrocarbon fraction from said second defluorination zone as net defluorination product.

5. In a process for the alkylation of a low-boiling isoparaffin with low-boiling olefin in the presence of a hydrofluoric acid catalyst, wherein the effluent of such an alkylation is separated into a hydrofluoric acid phase and a hydrocarbon phase, and said hydrocarbon phase is introduced into a fractional distillation zone for separation into a vaporous hydrofluoric acid fraction and a liquid hydrocarbon fraction containing dissolved organic fluorides, the improvement comprising withdrawing a major portion of said liquid hydrocarbon fraction from the lower section of said distillation zone and passing it to a first defluorination zone wherein organic fluorine compounds are thermally decomposed and vapors containing hydrogen fluoride are formed, passing vaporous effluent from said first defluorination zone directly to said lower section of said distillation zone, passing a minor portion of said liquid hydrocarbon from said lower section of said distillation zone to the kettle of the latter which serves as a second defluorination zone, said minor portion being the sole stream charged to said kettle, and withdrawing the resulting defluorinated hydrocarbon fraction from said second defluorination zone as net defluorinated product.

6. The process according to claim 5, wherein said first defluorination zone is an external reboiling zone.

7. The process according to claim 5 wherein said first defluorination zone is operated at a temperature in the range between 350 and 500° F.

8. The process according to claim 5 wherein said isoparaffin is isobutane, and said olefin comprises propylene and butylene.

References Cited in the file of this patent

UNITED STATES PATENTS

| | | |
|---|---|---|
| 2,113,130 | Dunham | Apr. 5, 1938 |
| 2,134,836 | Ostergaard | Nov. 1, 1938 |
| 2,759,032 | Dixon | Aug. 14, 1956 |
| 2,885,354 | Myers | May 5, 1959 |